(12) United States Patent
Strauss et al.

(10) Patent No.: US 8,356,130 B2
(45) Date of Patent: Jan. 15, 2013

(54) MECHANISM FOR RECORDING UNDELIVERABLE USER-LEVEL INTERRUPTS

(75) Inventors: Karin Strauss, Seattle, WA (US); Jaewoong Chung, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 628 days.

(21) Appl. No.: 12/633,032

(22) Filed: Dec. 8, 2009

(65) Prior Publication Data

US 2011/0040914 A1 Feb. 17, 2011

Related U.S. Application Data

(60) Provisional application No. 61/233,983, filed on Aug. 14, 2009.

(51) Int. Cl.
*G06F 13/24* (2006.01)
(52) U.S. Cl. .................. 710/263; 710/268; 719/318
(58) Field of Classification Search .......... 710/260–268; 719/318
See application file for complete search history.

(56) References Cited

U.S. PATENT DOCUMENTS

| | | | |
|---|---|---|---|
| 6,061,709 A | 5/2000 | Bronte | |
| 6,148,361 A | 11/2000 | Carpenter et al. | |
| 6,370,606 B1 | 4/2002 | Bonola | |
| 7,080,179 B1 | 7/2006 | He et al. | |
| 7,472,161 B2 * | 12/2008 | Davis et al. | 709/203 |
| 7,529,235 B2 * | 5/2009 | Zhang | 370/356 |
| 7,581,051 B2 | 8/2009 | Talluri et al. | |
| 7,689,747 B2 | 3/2010 | Vega et al. | |
| 7,769,923 B2 | 8/2010 | Pope et al. | |
| 7,996,593 B2 | 8/2011 | Blackmore et al. | |
| 8,103,816 B2 | 1/2012 | Tiruvallur et al. | |
| 8,131,895 B2 | 3/2012 | Pope et al. | |
| 2006/0218328 A1 | 9/2006 | Vega et al. | |
| 2007/0073928 A1 | 3/2007 | Bruno et al. | |
| 2010/0192163 A1 | 7/2010 | Pope et al. | |
| 2011/0040913 A1 | 2/2011 | Chung et al. | |
| 2011/0040915 A1 | 2/2011 | Strauss et al. | |

FOREIGN PATENT DOCUMENTS

| | | |
|---|---|---|
| WO | 00/06084 A2 | 2/2000 |
| WO | 00/36505 A1 | 6/2000 |
| WO | 2005/098624 A1 | 10/2005 |

OTHER PUBLICATIONS

Parker, Mike, "A Case for User-Level Interrupts," ACM SIGARCH Computer Architecture News, vol. 30, No. 3, Jun. 2002, URL: http://portal.acm.org/citation.cfm?id=571666.571675, pp. 17-18.

Ruocco, Sergio, "A Real-Time Programmer's Tour of General-Purpose L4 Microkernels," EURASIP Journal on Embedded Systems, vol. 2008, ID #234710, Jan. 2008, URL: http://portal.acm.org/citation.cfm?id=1361158, pp. 1-14.

(Continued)

*Primary Examiner* — Clifford Knoll
(74) *Attorney, Agent, or Firm* — Zagorin O'Brien Graham LLP

(57) ABSTRACT

A method includes recording a user-level interrupt as undeliverable in a mailbox at least partially based on an interrupt domain identifier and an interrupt recipient identifier included in a user-level interrupt message associated with the user-level interrupt. The recording is at least partially based on an indication that the user-level interrupt is undeliverable to a recipient application thread executing on a processor core of a plurality of processor cores in a multi-core system.

20 Claims, 4 Drawing Sheets

OTHER PUBLICATIONS

Bracy, Anne, et al., "Disintermediated Active Communication," IEEE Computer Architecture Letters, vol. 5, 2006, 4 pages.

Wong, Henry, et al, "Pangaea: A Tightly-Coupled IA32 Heterogeneous Chip Multiprocessor," Proceedings of Parallel Architectures and Compilation Techniques (PACT 08), 2008, Toronto, Ontario, Canada, 10 pages.

Seo et al., "Efficient User-Level I/O in the ARX Real-Time Operating System," ACM SIGPLAN Workshop on Languages, Compilers, and Tools for Embedded Systems, 1998, pp. 80-86.

Ritchie et al., "User Level IPC and Device Management in the Raven Kernel," Usenix Association Proc. Symp. on Microkernals and other Kernel Architectures, 1993, pp. 111-125.

* cited by examiner

MECHANISM FOR RECORDING UNDELIVERABLE USER-LEVEL INTERRUPTS

CROSS-REFERENCE TO RELATED APPLICATION(S)

This application claims the benefit of U.S. provisional application No. 61/233,983, filed Aug. 14, 2009, entitled "User-Level Interrupt Mechanism for Multi-Core Architectures," naming Jaewoong Chung and Karin Strauss as inventors, which application is hereby incorporated by reference.

BACKGROUND

1. Field of the Invention

This invention relates to multi-processor systems and more particularly to interrupt processing in multi-processor systems.

2. Description of the Related Art

In general, an interrupt (e.g., exception) is an event that changes instruction execution from a currently executing instruction flow to another instruction flow. An interrupt is typically generated by a processor or device coupled to a processor. A typical interrupt processing mechanism changes program control flow of the interrupted processor to an interrupt handler (e.g., interrupt service routine). Referring to FIG. 1, an exemplary multi-processor system (e.g., system 100) includes at least two processor cores (i.e., central processing units, cores, or hardware accelerators) configured to concurrently execute multiple application threads. An exemplary interrupt delivery mechanism (e.g., an interrupt delivery mechanism of the x86 architecture) includes an interrupt controller (e.g., a local Advanced Programmable Interrupt Controller (APIC)) for each core in the system. In addition, an interrupt controller (e.g., I/O APIC) may be included for each peripheral bus in the system. A dedicated bus or a system bus (e.g., crossbar 116) may be used to communicate between APICs.

In general, a local APIC manages external interrupts for a corresponding core or CPU. The local APIC is able to accept and generate inter-processor interrupt (IPI) messages. Exemplary IPIs occur when a first core of a multi-processor system offloads a parallel task to another core. A typical local APIC supports up to 224 usable interrupt vectors, which correspond to interrupt priority and respective interrupt service routines. Another 32 vectors are reserved for interrupt processing by the associated core or CPU.

Referring to FIGS. 1 and 2, an inter-processor interrupt is generated by a core (e.g., core 102) that writes to the Interrupt Control Register (ICR) in a corresponding local APIC (e.g., local APIC 106) (202). An ICR includes fields for a destination identifier, delivery mode, an interrupt vector, and other suitable information. Local APIC 106 generates an interrupt message and broadcasts the interrupt message through the on-chip network using crossbar 116 (204). A local APIC (e.g., local APIC 108) that receives the interrupt message determines whether to accept the interrupt based on a state of the associated core (e.g., core 104) and a state of the receiving local APIC itself (e.g., a delivery mode and a destination identifier). For example, if local APIC 108 has an identifier, physical ID, or logical ID that matches the destination ID according to the delivery mode, the local APIC 108 accepts the interrupt message, reads an interrupt vector number from the interrupt message, and a corresponding bit is set in the Interrupt Request Register (IRR). Local APIC 108 sends an ACK (acknowledgement) message to local APIC 106 that originated the interrupt message to confirm the acceptance of the interrupt message by local APIC 108 (206).

The interrupt vector number read by local APIC 108 from the interrupt message represents a priority of the interrupt, which is compared to a priority of other pending interrupts and a priority of one or more currently executing threads. If the interrupt has the highest priority, a corresponding bit in an In-Service Register (ISR) is set and the interrupt is delivered to core 104. Logic in local APIC 108 sends a message to core 104 (208). Receiving the message, core 104 detects the interrupt and at an instruction boundary of the currently executing application thread, the core executes an interrupt service routine. The interrupt service routine accesses an Interrupt Descriptor Table (IDT) based on contents of an Interrupt Descriptor Table Register (IDTR) and obtains a code segment selector and an offset and privilege mode of an interrupt handler corresponding to the interrupt vector. Once the interrupt handler entry point is determined based on a segment selector and offset program control is transferred to the interrupt handler, core 104 handles the interrupt by executing actions specified in the interrupt handler (212). Control returns from the interrupt handler and may return to a previously executing application thread, according to results of those actions specified by the interrupt handler (214).

Still referring to FIGS. 1 and 2, an interrupt from a device (e.g., device 112) coupled to a peripheral bus (e.g., peripheral bus 114) of a multi-processor system (e.g., system 100) is handled similarly to inter-processor interrupts, as described above. For example, in a network packet processing system, device 112 is a network interface card (NIC). When packets arrive, the NIC sends an interrupt to the processors to notify the processors of the arrival of the packets. Device 112 generates an interrupt by asserting an interrupt signal (202) and the I/O APIC (e.g., I/O APIC 110) reads a corresponding entry in an Interrupt Redirection Table (IRT) 116. I/O APIC 110 generates an interrupt message with information from the entry, e.g., destination identifier, delivery mode, interrupt vector, or other suitable information. Then, the interrupt is broadcast to the local APICs (e.g., local APIC 106 and local APIC 108) (204). A destination local APIC (e.g., local APIC 108) sends an acknowledgement to the I/O APIC (206). Then, the interrupt is delivered to a receiving core corresponding to the destination local APIC (e.g., core 104). Core 108 processes the interrupt (210, 212, 214, 216) in the same way that core 108 processes inter-processor interrupts.

Sending an interrupt from an application executing on one core to another core requires an originating core to transfer control to the operating system because the ICR can be written only in kernel-mode. An application that generates an interrupt to another core switches into kernel-mode to write the ICR and then switches back into user-mode, requiring two control transfers. A typical transfer of control to the operating system uses many cycles (e.g., thousands of cycles to tens of thousands of cycles or more depending on the complexity of an operating system implementation). Moreover, if the interrupt is used to pass information to application threads, an additional transfer of control is required to transfer the program control back to the application thread. Such high overhead of using the interrupt mechanism associated with the operating system for processing user-level interrupts may slow down system performance.

SUMMARY OF EMBODIMENTS OF THE INVENTION

In at least one embodiment of the invention, a method includes recording a user-level interrupt as undeliverable in a mailbox at least partially based on an interrupt domain identifier and an interrupt recipient identifier included in a user-level interrupt message associated with the user-level interrupt. The recording is at least partially based on an indication that the user-level interrupt is undeliverable to a recipient application thread executing on a processor core of a plurality of processor cores in a multi-core system.

In at least one embodiment of the invention, an apparatus includes a first processor core of a plurality of processor cores in a multi-core system. The apparatus includes a mailbox storage structure configured to store undeliverable user-level interrupt messages. The mailbox storage structure is accessible by the first processor core according to contents of a mailbox storage structure root storage element, an interrupt domain identifier, and an interrupt recipient identifier.

In at least one embodiment of the invention, a method includes sending an indicator of a user-level interrupt not being accepted by a recipient of a user-level interrupt message when at least one of an interrupt domain of an application thread executing on a first processor core of a plurality of processor cores and a recipient identifier of the application thread executing on the first processor core and corresponding fields in the user-level interrupt message do not match, and sending an indicator of the user-level interrupt being accepted, otherwise.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
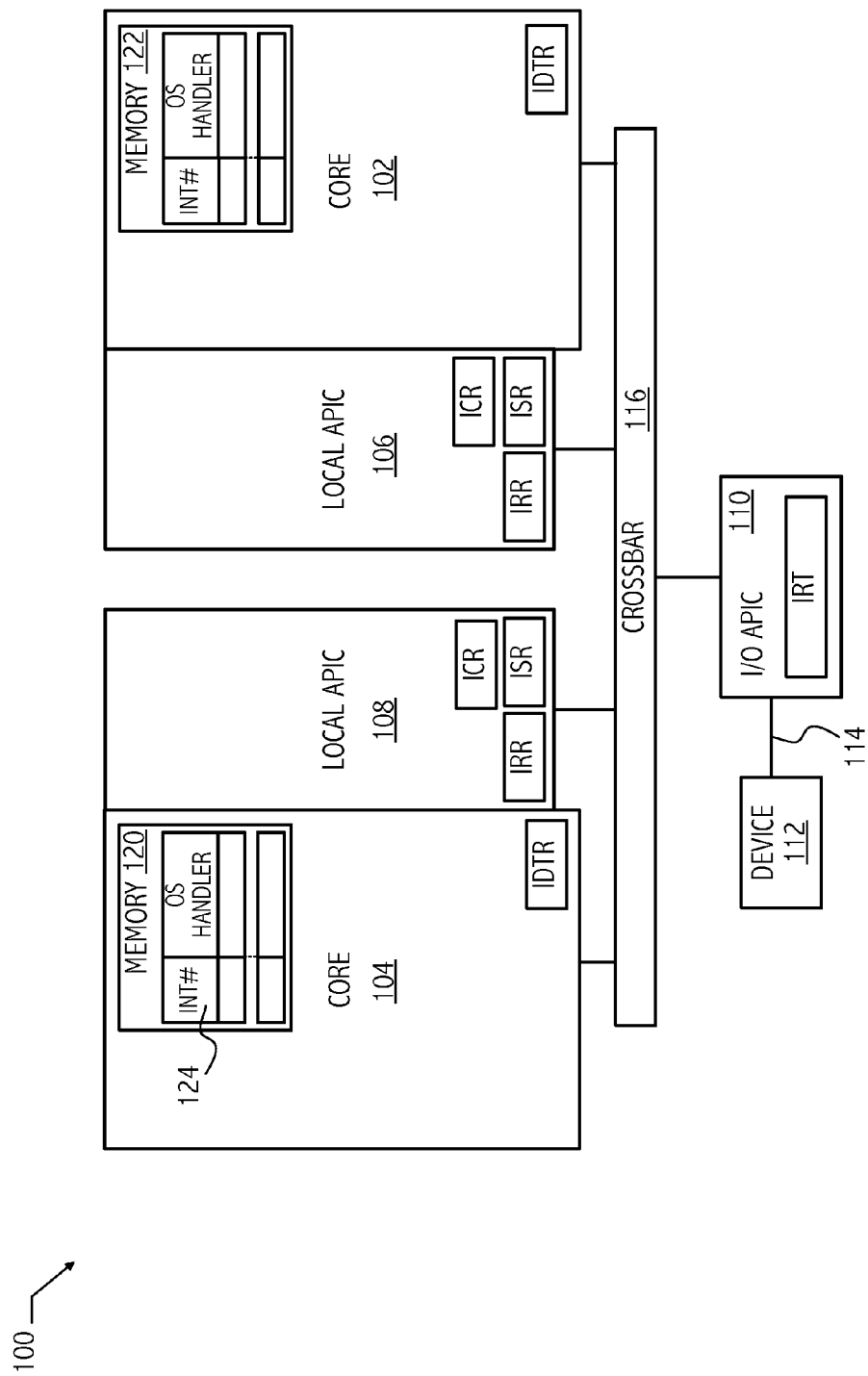
FIG. 1 is a block diagram of an exemplary interrupt delivery mechanism.
Figure 2:
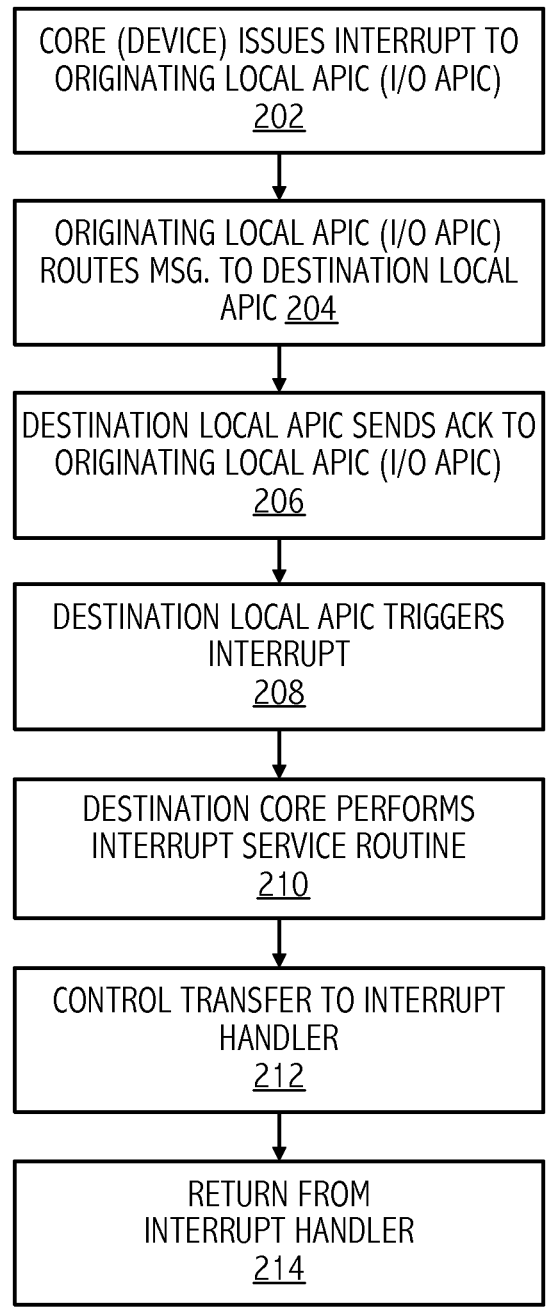
FIG. 2 illustrates exemplary information and control flows for interrupts using the interrupt delivery mechanism of FIG. 1.
Figure 3:
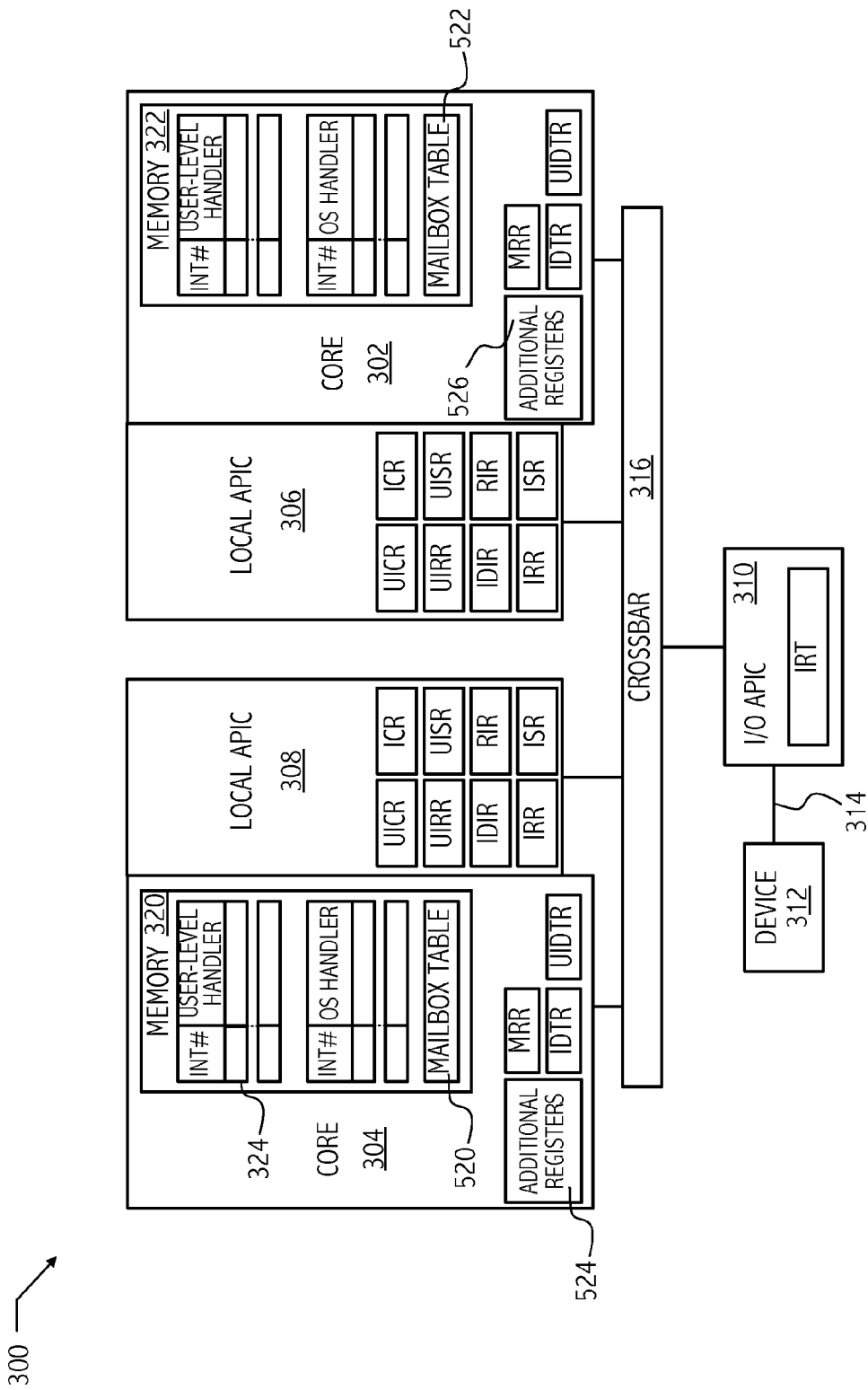
FIG. 3 illustrates a block diagram of an exemplary interrupt delivery mechanism consistent with at least one embodiment of the invention.
Figure 4:
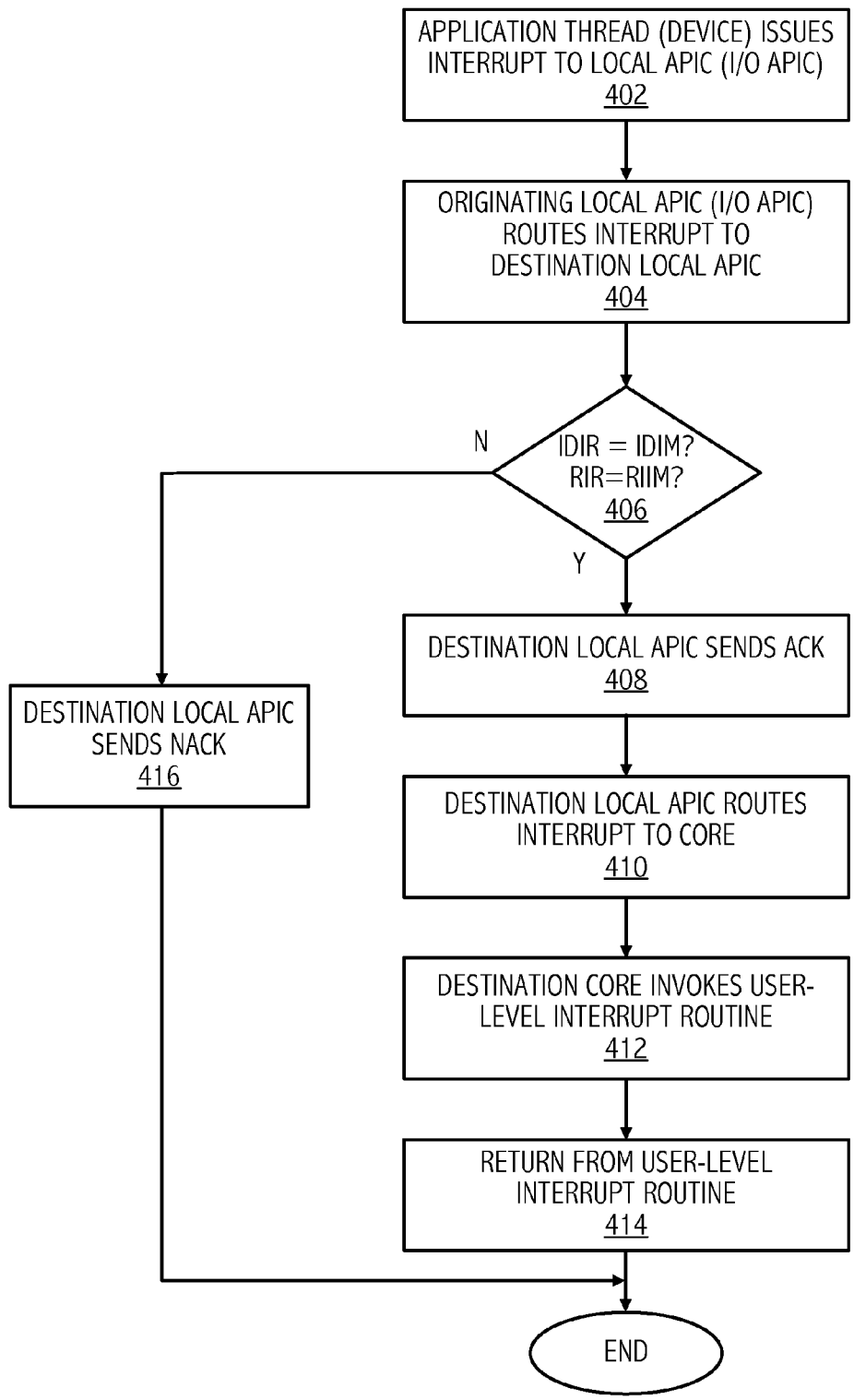
FIG. 4 illustrates exemplary information and control flows for the exemplary interrupt delivery mechanism of FIG. 3 consistent with at least one embodiment of the invention.

An exemplary user-level interrupt delivery technique consistent with one or more embodiments of the invention reduces a number of control transfers used when processing user-level interrupts (e.g., interrupts generated by an application thread or interrupts generated by a device coupled to a peripheral bus of the system) by delivering the user-level interrupts directly to a user-level application thread. Referring to FIGS. 3 and 4, an exemplary multi-processor system (e.g., system 300) includes at least two processor cores (i.e., central processing units, cores, or hardware accelerators) configured to concurrently execute multiple application threads. Each local APIC includes an interrupt domain identifier register (i.e., IDIR) and a recipient identifier register (i.e., RIR). An IDIR is a state element that stores an interrupt domain identifier of an application thread currently executing on the associated core. An interrupt domain is a set of application threads and devices allowed to exchange user-level interrupts. Each domain has a unique identifier named Interrupt Domain Identifier. The identifier is unique in an operating system instance. Each member of the domain is given a Recipient Identifier, which is unique only within the domain. An RIR is a state element that stores a recipient identifier of the application thread currently executing on the core. In system 300, the destination application thread of a user-level interrupt is identified by a combination of the interrupt domain identifier and the recipient identifier.

Although FIG. 3 illustrates that the IDIR and RIR of system 300 are included in a local APIC, these identifiers could also be stored in any other per-core module. Although local APIC 306 and local APIC 308 are illustrated as being separate from cores 302 and 304, respectively, note that the functionality of local APIC 306 and local APIC 308 may be incorporated into corresponding core circuitry or other per-core modules. The states of the IDIR and RIR registers are saved and restored during a context switch since the two identifiers are part of an application thread context. The IDIR and RIR may be saved and restored by mapping through Machine State Registers (MSR), accesses through Memory Mapped I/O (MMIO), instruction set architecture extensions, or other suitable technique.

Interrupt messages are generated by an APIC (e.g., local APIC 306, local APIC 308, or I/O APIC 310) in response to a core command or a device command. In at least one embodiment, system 300 modifies known interrupt messages to support user-level interrupts. For example, an x86 interrupt message may be configured to include a delivery mode (i.e., DM) field, which is set to a code specific to user-level interrupts, and/or a DESTINATION field, which is configured to identify a recipient application thread of the interrupt. In at least one embodiment of system 300, an interrupt domain identifier may be included in an x86 interrupt message payload. In at least one embodiment of system 300, rather than extending existing interrupt messages, a distinct user-level interrupt message is used. For example, the user-level interrupt message may include an interrupt domain identifier, a recipient identifier, a user-level interrupt type, and/or other suitable information.

Still referring to FIGS. 3 and 4, an application thread executing on a core (e.g., core 302) of system 300 generates a user-level interrupt by writing to a user-level interrupt control register (i.e., UICR) of a corresponding local APIC (e.g., local APIC 306) (402). A UICR is a user-level replica of an interrupt control register (i.e., ICR), which is included for each local APIC. The UICR is accessible in user-mode and writing to the UICR does not require operating system assistance or transfers of control. In at least one embodiment, the application thread configures a DESTINATION field of the UICR to identify a recipient of the interrupt and configures a DM field of the UICR to include a particular code indicative of user-level interrupts. Local APIC 306 generates a user-level interrupt message based on values in the UICR (404), similarly to generation of operating system-level interrupts (i.e., the interrupts issued by the existing interrupt mechanism involving the operating system interrupt handler) based on contents of an ICR. The interrupt domain identifier contained in the IDIR is included by local APIC 306 in a user-level interrupt message. Note that the interrupt domain identifier in the IDIR corresponds to the identity of the interrupt-initiating application thread, not the intended destination application thread. Accordingly, the user-level interrupt is configured for receipt by a receiving application thread in the same interrupt domain as the initiating application thread.

In at least one embodiment of system 300, local APIC 306 broadcasts the user-level interrupt message to all cores, similarly to the routing of operating system-level interrupts. An interconnect network (e.g., crossbar 316, or other suitable bus structure) broadcasts user-level interrupt messages using the same techniques used to broadcast operating system level interrupt messages. Thus, the network need not distinguish between user-level interrupts and operating system-level interrupts. In at least one embodiment of system 300, user-level interrupts could be multicast or sent directly to a destination core.

In at least one embodiment, in response to receiving an interrupt message, a local APIC (e.g., local APIC 308) compares contents of a DM field of the interrupt message to a predetermined user-level interrupt code to determine if the interrupt is a user-level interrupt. If the interrupt is a user-level interrupt, local APIC 308 compares contents of a DESTINATION field of the interrupt message (i.e., recipient identifier of the interrupt message, RIIM) to contents of the RIR of local APIC 308 and compares the interrupt domain identifier included in the interrupt message (i.e., IDIM) to contents of the IDIR of local APIC 308 (406). If the values match, the interrupt is destined for an application thread associated with local APIC 308 and the corresponding core (e.g., core 304). Local APIC 308 determines an interrupt vector number based on the interrupt message and changes a state of a corresponding bit in the UIRR, which is a user-level replica of the IRR corresponding to an individual local APIC. Then, local APIC 308 sends an acknowledgement message (i.e., ACK) to the originating local APIC (e.g., local APIC 306) (408) indicating that the interrupt message has been accepted. In at least one embodiment of system 300, if the values do not match, then local APIC 308 sends a NACK message to local APIC 306 (416) indicating that the interrupt is not accepted by local APIC 308.

When local APIC 308 accepts a user-level interrupt, it routes the interrupt to core 304 for processing (410). In general, the core will process a user-level interrupt when the user-level interrupt has higher priority than other accepted interrupts and a thread currently executing on the core. For example, a user-level interrupt has lower priority than any operating system-level interrupts. When the core processes a user-level interrupt, it sets a corresponding bit in the User-level ISR (UISR), a user-level replica of the ISR added per local APIC. Then, core 304 invokes program code for user-level interrupts and reads the User-level IDTR (UIDTR), which points to the User-level IDT (UIDT) (412). The UIDT is a user-level replica of the IDT and contains pointers to user-level interrupt handlers. In at least one embodiment of system 300, the UIDT and the IDT entries have the same data structure and are merged together into a single merged IDT. The merged IDT includes the operating system-level handler and the user-level handlers. Accordingly, a separate UIDTR is not included.

Core 304 accesses a code segment selector, offset, and/or other suitable information of the user-level handler corresponding to a vector number of the user-level interrupt. Core 304 uses that information to calculate an entry point into memory corresponding to the user-level interrupt handler. Finally, program control flow is transferred to the user-level interrupt handler by jumping to the location in memory of the user-level interrupt handler entry point (412).

When the user-level interrupt handler finishes, corresponding bits in the UISR are reset by software, microcode, or hardware. Local APIC 308 detects the reset of those bits in the UISR and checks the priority of the current application thread and the rest of pending interrupts. Local APIC 308 then decides whether to deliver any remaining pending interrupts according to their priority relative to the current application thread. If local APIC 308 decides to deliver another pending interrupt, it routes the interrupt to core 304 for processing (410), Otherwise, core execution returns from the user-level interrupt routine (414). In at least one embodiment of system 300, this procedure is triggered by a return from interrupt instruction, which may be a user-level specific instruction, e.g., UIRET, which is a user-level version of an IRET instruction. Note that only one context change is used for interrupt processing in system 300 (414) as compared to the two context changes (214 and 216) used for interrupt processing in system 100.

In at least one embodiment of system 300, system 300 detects a condition where a destination application thread for a user-level interrupt is preempted before the user-level interrupt is delivered. In at least one embodiment, system 300 determines that the user-level interrupt cannot be delivered (i.e., the user-level interrupt is undeliverable) by having the sender (e.g., local APIC 306) determine whether an ACK message has been received for the broadcasted user-level interrupt message. If the user-level interrupt is undeliverable, in at least one embodiment, local APIC 306 triggers an interrupt (e.g., user-level interrupt or operating system-level interrupt) to core 302, with a predetermined interrupt vector number, which is reserved for a deferred interrupt delivery handler that handles deferred delivery of undeliverable interrupts (i.e., deferred). Core 302 invokes a user-level interrupt subroutine and jumps to a handler mapped to the corresponding user-level interrupt handler indicated by the UIDT. The handler can be a user-level handler or an operating system-level handler. In a managed environment, system-level software, which executes on top of the operating system, manages user-level applications directly. The system-level software remembers the deferred user-level interrupt on behalf of the operating system and delivers the interrupt when the destination application is rescheduled. For example, if user-level interrupts are used in a managed environment, a user-level interrupt handler may be used to deal with the deferred user-level interrupt. If not, an operating system-level handler is used. In at least one embodiment of system 300, the choice between a user-level interrupt and an operating system-level interrupt is made by a software system; however, system 300 may support user-level interrupt deferral in hardware and/or microcode.

In at least one embodiment of system 300, rather than invoking an operating system-level or user-level interrupt handler when local APIC 306 detects that a user-level interrupt cannot be delivered, local APIC 306 invokes an interrupt mailbox technique. This hardware mechanism can be implemented in microcode or directly as a hardware finite state machine. The operating system processes any deferred interrupt using an operating system-level mailbox handler that is registered to a pre-specified entry of the UIDT. The operating system also maintains an interrupt mailbox that consists of an interrupt queue per recipient, which is identified by an interrupt domain identifier and a recipient identifier. When invoked, the operating system-level mailbox handler inserts a deferred interrupt into a corresponding queue in the interrupt mailbox. Later, when a recipient application thread is scheduled for execution on a core, the operating system determines whether any deferred interrupts are in a corresponding mailbox. If there is a deferred interrupt, the operating system configures the system stack as if the recipient application thread had received the interrupt at that moment and the recipient application thread jumps to a corresponding user-level interrupt handler.

In at least one embodiment, the interrupt mailbox technique includes a Mailbox Root Register (i.e., MRR) for each core. The MRR is managed and may need to be switched in and out by the operating system, according to management of a Mailbox Table (e.g., Mailbox Table 520 or Mailbox Table 522). The MRR(s) is (are) not accessible by regular instructions running in user-mode. In at least one embodiment of system 300, Mailbox Table 520 is a global structure for all threads, thus the MRR does not need to be switched in and out. In at least one embodiment, Mailbox Table 520 is stored in shared memory space. Mailbox Table 520 includes state information indicating how to locate the mailboxes of specific recipients. In at least one embodiment of a Mailbox Table, entries associate a Domain ID and a Recipient ID to a Mailbox Descriptor. In at least one embodiment of system 300, Mailbox Tables and Mailboxes are allocated in address spaces not directly accessible to user mode instructions, i.e., only privileged instructions, microcode, or hardware may be able to directly access the Mailbox Table and the Mailboxes.

In at least one embodiment of system 300, Mailbox Table 520 is organized as a hierarchical set of tables. The state is organized as one main root table (Domain Mailbox Pointer Table, or DMPT) that relates Domain identifiers to fields that point to other auxiliary tables, Recipient Mailbox Pointer Tables (RMPT). A recipient mailbox pointer table relates Recipient identifiers to Mailbox Descriptors, which is information used to locate a recipient's mailbox. Exemplary Mailbox Descriptors include one or more of a Mailbox pointer, its allocated size, and the location within a Mailbox where the next pending user-level interrupt should be recorded. In at least one embodiment of system 300, the Mailbox Table is organized as a flat table of state information. An entry is indexed by a Domain ID and a Recipient ID and contains a Mailbox Descriptor.

When an undeliverable interrupt is received by a core, instead of trapping to the operating system, the hardware (or microcode) accesses a corresponding Mailbox Root Register to read a pointer to the Mailbox Table. Hardware then accesses a Mailbox Descriptor from the Mailbox Table based on the Domain ID and Recipient ID of the intended recipient. Then, the Mailbox Descriptor is used to record the undeliverable user-level interrupt in the recipient's Mailbox.

In at least one embodiment of system 300, the operating system configures the Mailbox Table and the Mailbox Root Register. If the Mailbox Table is hierarchical, a Domain Mailbox Pointer Table is allocated and initialized at operating system initialization time. The Domain Mailbox Pointer Table may be resized later if additional Domains are required. A Recipient Mailbox Pointer Table is allocated and initialized each time a new Domain is created. If the Recipient Mailbox Pointer Table is flat, it is allocated and initialized at operating system initialization time. The Recipient Mailbox Pointer Table may be resized later if additional Domain-Recipient pairs are required. In at least one embodiment of system 300, when an application thread joins a Domain and receives a Recipient ID from the operating system, the operating system also creates mailbox buffers and a Mailbox Table. The operating system allocates memory in the recipient's memory space for the Mailbox buffer corresponding to a recipient application thread and adds an entry to the Mailbox Table to allow the hardware to subsequently locate the Mailbox buffer.

An exemplary Mailbox is implemented as a bit vector or as a queue, but other suitable structures may be used. When implemented as a bit vector, individual bits of the Mailbox bit vector indicate whether there are user-level interrupts of a particular type pending for the particular recipient application thread. The Mailbox does not encode how many user-level interrupts of each type a recipient has pending. The bit vector encoding is compact, can be recorded directly in the Mailbox Descriptor field of an entry in the Mailbox Table, and may resemble a local APIC UIRR. When a Mailbox is implemented as a queue, individual entries of the Mailbox describe a particular instance of an undeliverable user-level interrupt type. A queue implementation may use more space than a bit vector implementation, but is capable of recording the order in which user-level interrupts were recorded and how many of each type occurred. A Mailbox Descriptor contains a pointer to the Mailbox buffer and the Mailbox buffer size. In at least one embodiment, the Mailbox Descriptor includes a pointer to a next free entry in the Mailbox buffer.

In at least one embodiment of system 300, when a user-level interrupt cannot be delivered, system 300 uses Domain ID and Recipient ID to index a Mailbox entry for a destination application thread of the undeliverable interrupt. If a bit vector format Mailbox is used, a corresponding bit to the interrupt vector number is set in the bit vector. If a queue format Mailbox is used, the interrupt is queued in a FIFO manner. In at least one embodiment of system 300, undeliverable interrupts may be enqueued using other suitable techniques, e.g., forming a queue of deferred interrupts in priority order.

When using a queue format for a Mailbox, the Mailbox may overflow when the system (e.g., via hardware or microcode) attempts to add an undeliverable user-level interrupt entry to a full Mailbox. An exemplary technique for handling the overflow includes trapping to the operating system and notifying the operating system that an overflow has occurred. In response, the operating system may allocate more space for the Mailbox. Another exemplary technique includes ignoring the newly undeliverable interrupt. In at least one embodiment, system 300 ignores an interrupt already recorded in the Mailbox by overwriting it. Other suitable techniques for handling Mailbox overflow may be used. In at least one embodiment of system 300, the Mailbox Overflow technique that is used by system 300 may be configurable by the operating system, e.g., by using a control bit to select among the possible Mailbox Overflow techniques.

When the operating system switches an application thread into the program flow for execution, the operating system drains the Mailbox associated with that particular application thread. If the Mailbox uses the bit-vector format, the operating system performs a logical-OR operation between the UIRR of the local APIC and the Mailbox bit vector of the recipient application thread prior to executing the application thread, but after restoring its state. Then, the local APIC hardware delivers the drained interrupts individually as if they were all received concurrently. If a Mailbox uses the queue format, the operating system delivers the interrupts recorded in the Mailbox queue directly (e.g., by jumping to the corresponding handler) immediately before the application thread starts to execute, but after restoring its state. The corresponding local APIC UIRR and UISR are also updated to match pending user-level interrupt(s) that is(are) being processed.

Referring to FIG. 3, in at least one embodiment of system 300, to support user-level interrupts generated by a device, an IRT table in I/O APIC 310 is extended to include an interrupt domain identifier per table entry. The interrupt domain identifier is used only when a DM field of the entry is set to a predetermined user-level interrupt value. When a device (e.g., device 312) generates an interrupt, the IRT provides an interrupt message based on IRT fields, e.g., the DM field, the DESTINATION field, or other suitable fields of the table entry mapped to the interrupt line. If the DM field is set to the predetermined user-level interrupt value, the interrupt domain identifier is included with the interrupt message. Once the user-level interrupt message is generated, it is routed, accepted, and handled similarly to an IPI message.

In at least one embodiment of system 300, rather than extending the IRT table in the I/O APIC, additional hardware is included in the path of an interrupt message from device 312 to cores 302 and 304. That additional hardware detects device interrupts intended to be handled as user-level interrupts (pre-registered as user-level interrupts by additional hardware or microcode) and performs the mapping between a device interrupt to user-level interrupts (e.g., I/O memory management unit).

When a user-level interrupt generated by device 312 cannot be delivered to its intended recipient, unlike a local APIC for deferred user-level IPIs, I/O APIC 310 does not execute the handler for the deferred user-level interrupt. Rather, the I/O APIC 310 sets the DM field to a predetermined value (the predetermined value is different from the predetermined value used to indicate user-level interrupt messages), indicating an arbitrated interrupt, although the interrupt is user-level. In an arbitrated interrupt delivery mode, an I/O APIC 310 broadcasts a query message to ask local APIC 306 and local APIC 308 about the priority of the current application threads running on corresponding cores. I/O APIC 310 receives reply messages from local APIC 306 and local APIC 308 and selects the core with the lowest priority application thread as the destination for the interrupt. I/O APIC 310 sets the DESTINATION field to indicate the local APIC corresponding to the selected core and the original recipient identifier is included in the interrupt message payload. Then, I/O APIC 310 broadcasts the interrupt message. The local APIC of the selected core receives the interrupt message and determines whether or not the DM field of the interrupt message is set to the other predetermined value. The local APIC obtains an interrupt domain identifier and a recipient identifier from the payload. The local APIC triggers a user-level interrupt with a predetermined mailbox handler to the core and the microcode is invoked to process the deferred device interrupt in the same way that a deferred IPI is processed.

In at least one embodiment, system 300 need not always process undeliverable interrupts. Rather, system 300 may be configured to generate a notification of undeliverable interrupts or ignore an undeliverable interrupt. Each APIC (e.g., APIC 306, local APIC 308, and I/O APIC 310) includes a Failed Delivery Notification Mode field, which indicates whether a notification should be generated when a user-level interrupt cannot be delivered to one or more of its intended recipients. For example, a two-bit field may be used to encode the three possible states described in Table 1.

TABLE 1

Possible States of an Exemplary Failed Delivery Notification Mode Field

| State | Meaning |
| --- | --- |
| All | An undeliverable notification is issued if the user-level interrupt was not delivered to all of the intended recipients. |
| Any | An undeliverable notification is issued only if the user-level interrupt was delivered to none of the intended recipients. |
| None | No undeliverable notification is issued, even though the user-level interrupt was not delivered to any of the intended recipients. |

The state All is used only if all intended recipients of a user-level interrupt can be clearly identified. All intended recipients cannot be clearly identified, e.g., when a Recipient Group field is implemented with one bit, as described below, and there is no other mechanism to identify all intended recipients of the user-level interrupt. Note that more complex implementations are possible. For example, an implementation that allows specifying a set of required recipients for which notifications of undeliverable user-level are required is also possible given a larger Failed Delivery Notification Mode field.

Referring back to FIG. 3, in at least one embodiment of system 300, local APIC 306, local APIC 308, and/or I/O APIC 310 configure one or more recipients of a user-level interrupt. Each APIC includes a Recipient Group field that indicates the intended recipients of a user-level interrupt. This field can be implemented with only one bit, which determines whether there is only one recipient (encoded in a separate field, e.g., DESTINATION field) or all threads associated to the sender's domain are recipients (i.e., broadcast). More complex implementations include a larger field with various bit encodings for a recipient group, which may be a subset of all threads associated to the sender domain (i.e., multicast).

In at least one embodiment of system 300, the Recipient Group field and/or Failed Delivery Notification Mode field are included as part of the UICR register. However, in other embodiments the Recipient Group and/or Failed Delivery Notification Mode information is stored in separate registers. In at least one embodiment of system 300, one or more of those fields are part of the UICR register and the fields are set each time an application thread sends a user-level interrupt. Frequent field changes may substantially increase overhead in sending user-level interrupts, thereby impacting performance. In at least one embodiment of system 300, one or more of those fields are implemented in one or more separate registers and are pre-configured. In at least one embodiment of system 300, default values for one or more of those fields are stored in one or more separate registers. Thus, the sender only needs to set values in the UICR if they are different from the default values. Any update mechanisms to the UICR registers may be used to update those fields if they are contained in separate registers (e.g., through MMIO or via MSRs).

In at least one embodiment of system 300, user-level interrupt messages include the Failed Delivery Notification Status field and the Recipient Group field. The Failed Delivery Notification Status field indicates which intended recipients of a user-level interrupt did not receive the user-level interrupt. The field is used when the system is configured to notify delivery failures for more than one intended recipient (e.g., All Failed Delivery Notification Mode, described above). In at least one embodiment of system 300, the Failed Delivery Notification Status field is implemented as a register by itself or can be part of an existing status register. In at least one embodiment of system 300, to support multicast and broadcast mechanisms with an "All" notification mode, ACK responses are extended with the recipient identifier of an APIC sending the ACK response.

In at least one embodiment of system 300, local APIC 306, local APIC 308, and/or I/O APIC 310 are configured to distribute user-level interrupt messages by unicast, multicast, and broadcast techniques. Those techniques may be implemented to operate consistently with the actions described in Table 2. Note that the user-level interrupt messages may be distributed using message distribution techniques known in the art or other suitable distribution media that can directly or indirectly reach recipients from any point in the network.

TABLE 2

Actions associated with various configurations of the user-level interrupt mechanism

| Recipient Group | Notification Mode | Action |
|---|---|---|
| Unicast | All | Described above |
| | Any | Described above |
| | None | After sending a user-level interrupt to a single recipient, the sender APIC collects responses from the other APICs. However, even if there are no ACK messages, the sender APIC does not trigger an undeliverable user-level interrupt at the sender core. |
| Multicast | All | After sending a user-level interrupt to a set of recipients in a group, the sender APIC collects responses from the other APICs, along with their recipient IDs. If each recipient in the set of intended recipients has responded with an ACK, then the operation concludes successfully. Otherwise, an undeliverable user-level interrupt is triggered at the sender core and the unreachable intended recipients are reported in the Failed Delivery Notification Status field. |
| | Any | After sending a user-level interrupt to a set of recipients in a group, the sender APIC collects responses from the other APICs. If at least one recipient in the set of intended recipients has responded with an ACK, then the operation concludes successfully. Otherwise, an undeliverable user-level interrupt is triggered at the sender core. |
| | None | After sending a user-level interrupt to a set of recipients in a group, the sender APIC collects responses from the other APICs. However, even if there are no ACK messages, the sender APIC does not trigger an undeliverable user-level interrupt at the sender core. |
| Broadcast | All | After sending a user-level interrupt to all recipients in a group, the sender APIC collects responses from the other APICs, along with their recipient IDs. If each recipient in the set of intended recipients has responded with an ACK, then the operation concludes successfully. Otherwise, an undeliverable user-level interrupt is triggered at the sender core and the unreachable intended recipients are reported in the Failed Delivery Notification Status field. Note that this can only be implemented if the set of all intended recipients is explicitly identified. |
| | Any | After sending a user-level interrupt to all recipients in a group, the sender APIC collects responses from the other APICs. If at least one recipient in the set of intended recipients has responded with an ACK, then the operation concludes successfully. Otherwise, an undeliverable user-level interrupt is triggered at the sender core. |
| | None | After sending a user-level interrupt to all recipients in a group, the sender APIC collects responses from the other APICs. However, even if there are no ACK messages, the sender APIC does not trigger an undeliverable user-level interrupt at the sender core. |

In at least one embodiment of system 300, software executing on system 300 includes at least one system call to support user-level interrupts. Table 3 includes five exemplary system calls to support user-level interrupts. To configure a group of application threads and/or devices to exchange user-level interrupts, the system creates an interrupt domain using a CreateDomain( ) call. Those application threads and/or devices join the interrupt domain with a Subscribe( ) call and register the user-level interrupt handler with RegisterHandler( ). A user-level interrupt is sent by a store operation to UICR. The handler is unregistered with UnregisterHandler( ). The application threads and devices (e.g., through device driver) leave the interrupt domain with an Unsubscribe( ) call.

TABLE 3

User-level Interrupt Application Programming Interface

| Category | Function | Description |
|---|---|---|
| Interrupt Domain | interrupt_domain_identifier CreateDomain ( ) | Creates an interrupt domain and returns a unique interrupt domain identifier. |
| | void Subscribe (interrupt_domain_identifier) | Subscribes the calling thread to the interrupt domain identified by the interrupt_domain_identifier. |
| | void Unsubscribe (interrupt_domain_identifier) | Unsubscribes the calling thread to the interrupt domain identified by the interrupt_domain_identifier. |
| Interrupt Handler | void RegisterHandler (handler, interrupt_vector_number) | Registers handler to the interrupt domain that the calling thread joined. The handler is mapped to interrupt_vector_number. |
| | void UnregisterHandler (interrupt_vector_number) | Unregisters the handler mapped to interrupt_vector_number from the interrupt domain that the calling thread joined. |

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM).

The description of the invention set forth herein is illustrative, and is not intended to limit the scope of the invention as set forth in the following claims. For example, while the invention has been described in an embodiment that includes two cores, one of skill in the art will appreciate that the teachings herein can be utilized with additional cores or other processing units. Variations and modifications of the embodiments disclosed herein, may be made based on the description set forth herein, without departing from the scope and spirit of the invention as set forth in the following claims.

What is claimed is:

1. A method comprising:
   recording a user-level interrupt as undeliverable in a mailbox at least partially based on an interrupt domain identifier and an interrupt recipient identifier included in a user-level interrupt message associated with the user-level interrupt, and an indication that the user-level interrupt is undeliverable to a recipient application thread executing on a processor core of a plurality of processor cores in a multi-core system.

2. The method, as recited in claim 1, further comprising:
   receiving at least one message indicating that the user-level interrupt is not accepted by an intended recipient of the user-level interrupt, wherein the indication that the user-level interrupt is undeliverable is at least partially based on the at least one message.

3. The method, as recited in claim 1, wherein the indication that the user-level interrupt is undeliverable is based on a determination that an acknowledgement message has not been received for the user-level interrupt message.

4. The method as recited in claim 1, further comprising:
   processing entries of the mailbox after a recipient application thread state is restored to the processor core and prior to running the recipient application thread.

5. The method as recited in claim 1, further comprising:
   notifying an operating system of overflow of the mailbox in response to an attempt to record in the mailbox an additional user-level interrupt as undeliverable when the mailbox is full.

6. The method as recited in claim 5, further comprising:
   increasing mailbox storage space in response to notification of mailbox overflow.

7. The method as recited in claim 5, further comprising:
   ignoring the additional user-level interrupt in response to mailbox overflow.

8. The method as recited in claim 5, further comprising:
   overwriting the user-level interrupt recorded as undeliverable in the mailbox with the additional user-level interrupt, thereby ignoring the user-level interrupt.

9. The method as recited in claim 1, further comprising:
   creating a mailbox table entry and mailbox buffer when an application thread joins a domain and receives a recipient identifier from an operating system executing on the one or more processor cores.

10. An apparatus comprising:
    a first processor core of a plurality of processor cores in a multi-core system; and
    a mailbox storage structure configured to store undeliverable user-level interrupt messages and accessible by the first processor core according to contents of a mailbox root storage element, an interrupt domain identifier, and an interrupt recipient identifier.

11. The apparatus, as recited in claim 10, further comprising:
    the mailbox root storage element corresponding to the first processor core,
    wherein the first processor core is configured to store an undeliverable user-level interrupt message in the mailbox storage structure based on a corresponding mailbox descriptor stored in a mailbox table accessible according to the mailbox root storage element.

12. The apparatus, as recited in claim 10, further comprising:
    a mailbox table accessible according to contents of the mailbox root storage element,
    wherein the mailbox table resides in memory space shared by the plurality of processor cores.

13. The apparatus, as recited in claim 12, wherein the mailbox table comprises a hierarchical set of tables comprising a root table and at least one recipient mailbox pointer table, wherein the root table associates interrupt domain identifiers to recipient mailbox pointer tables.

14. The apparatus, as recited in claim 12, wherein the mailbox table includes entries of mailbox descriptors accessible according to the interrupt domain identifier and the interrupt recipient identifier.

15. The apparatus, as recited in claim 10, wherein the mailbox storage structure comprises a queue of individual entries corresponding to an undeliverable user-level interrupt type.

16. The apparatus, as recited in claim 10, wherein the mailbox storage structure comprises a bit vector indicative of whether one or more user-level interrupt types are pending for a particular recipient application thread.

17. The apparatus, as recited in claim 10, further comprising:
    a local interrupt controller corresponding to the first processor core, wherein the local interrupt controller comprises:
    an interrupt domain identifier state element configured to store an indicator of an interrupt domain of an application thread executing on the first processor core; and
    a recipient identifier state element configured to store an indicator of an application thread executing on the first processor core,
    wherein the local interrupt controller is configured to at least partially process a user-level interrupt based on contents of the interrupt domain identifier and the recipient identifier state element.

18. A method comprising:
    sending an indicator of a user-level interrupt not being accepted by a recipient of a user-level interrupt message when at least one of an interrupt domain of an application thread executing on a first processor core of a plurality of processor cores and a recipient identifier of the application thread executing on the first processor core and corresponding fields in the user-level interrupt message do not match, and sending an indicator of the user-level interrupt being accepted, otherwise.

19. The method as recited in claim 18, further comprising: generating an indicator that the user-level interrupt is undeliverable to an intended recipient application thread based on receipt of the indicator of the user-level interrupt not being accepted.

20. The method as recited in claim 18, further comprising: detecting an undeliverable status of the user-level interrupt and triggering an interrupt to the first processor core based thereon.

* * * * *